United States Patent [19]
Shimizu et al.

[11] Patent Number: 5,740,249
[45] Date of Patent: Apr. 14, 1998

[54] ENCRYPTION APPARATUS AND METHOD CAPABLE OF CONTROLLING ENCRYPTION PROCESS IN ACCORDANCE WITH AN INTERNAL STATE

[75] Inventors: Hideo Shimizu, Kawasaki; Shinichi Kawamura, Tokyo, both of Japan

[73] Assignee: Kabushiki Kaisha Toshiba, Kawasaki, Japan

[21] Appl. No.: 628,105

[22] Filed: Apr. 9, 1996

[51] Int. Cl.$^6$ .................................................. H04K 1/00
[52] U.S. Cl. ................ 380/28; 380/49; 380/42; 380/44; 380/50
[58] Field of Search .................. 380/49, 28, 42, 380/44, 50

[56] References Cited

U.S. PATENT DOCUMENTS

| | | |
|---|---|---|
| 4,157,454 | 6/1979 | Becker . |
| 5,058,164 | 10/1991 | Elmer et al. .............................. 380/50 |
| 5,241,597 | 8/1993 | Bright ....................................... 380/21 |

FOREIGN PATENT DOCUMENTS 6-266284  8/1994  Japan .

OTHER PUBLICATIONS

IBM Technical Disclosure Bulletin, vol. 20, No. 10, pp. 3982–3983, Mar. 1978, P.N. Prentice, "Method of Implementing Key Chaining".

*Primary Examiner*—David C. Cain
*Attorney, Agent, or Firm*—Oblon, Spivak, McClelland, Maier & Neustadt, P.C.

[57] ABSTRACT

An encryption apparatus is constituted by a plurality of rungs of round functions. Each round function comprises internal state storing means for storing an internal state, internal state updating means for updating the internal state stored in the storing means, and an F-function for executing an encryption upon receipt of data to be encrypted, an encryption key, and the internal state stored in the internal state storing means. The internal state stored in the internal state storing means is updated by the internal state updating means every time the encryption is executed by the F-function.

16 Claims, 16 Drawing Sheets

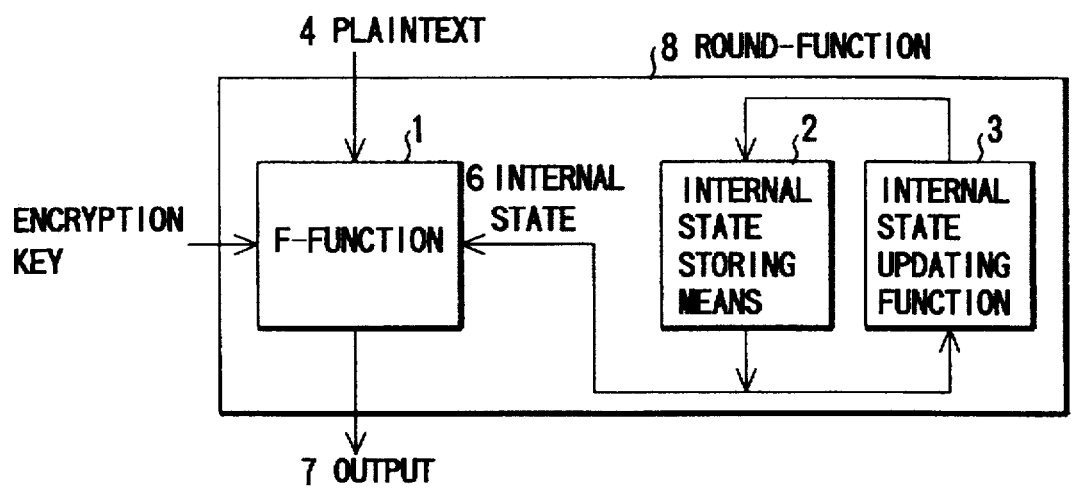
F I G. 1
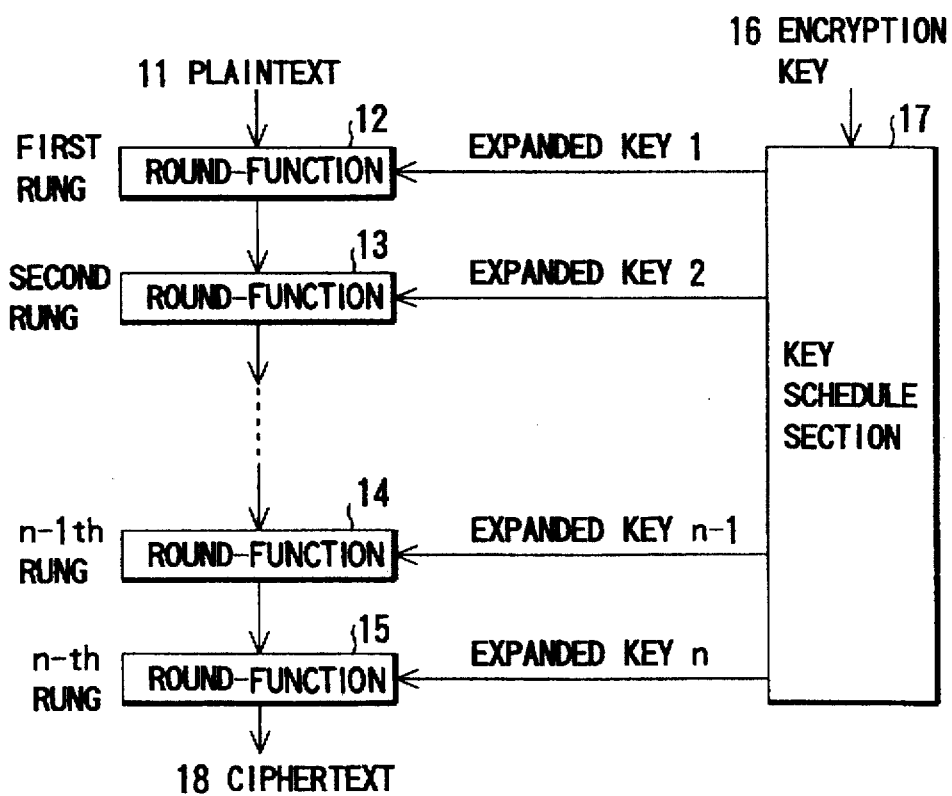
F I G. 2

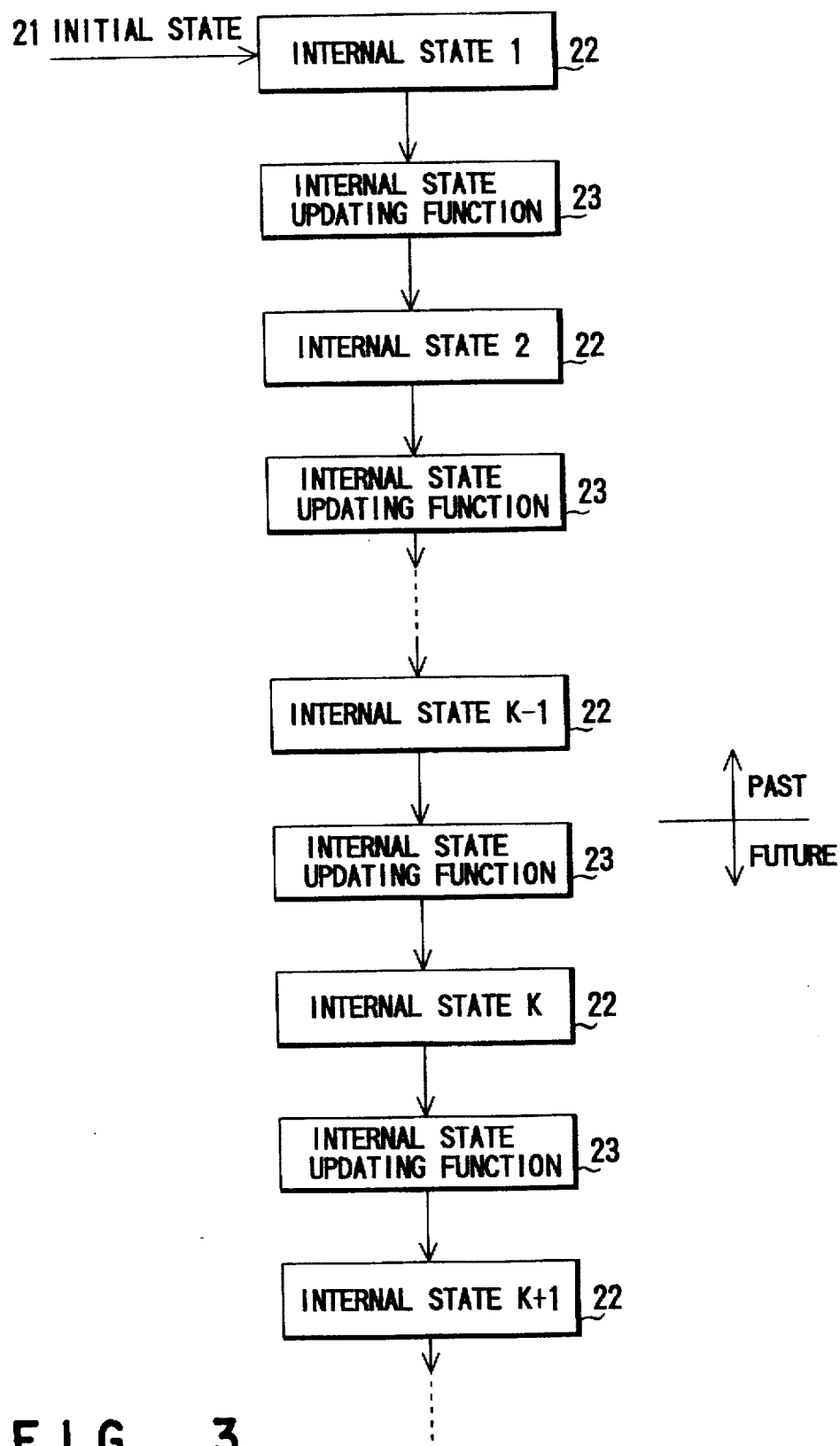
F I G. 3

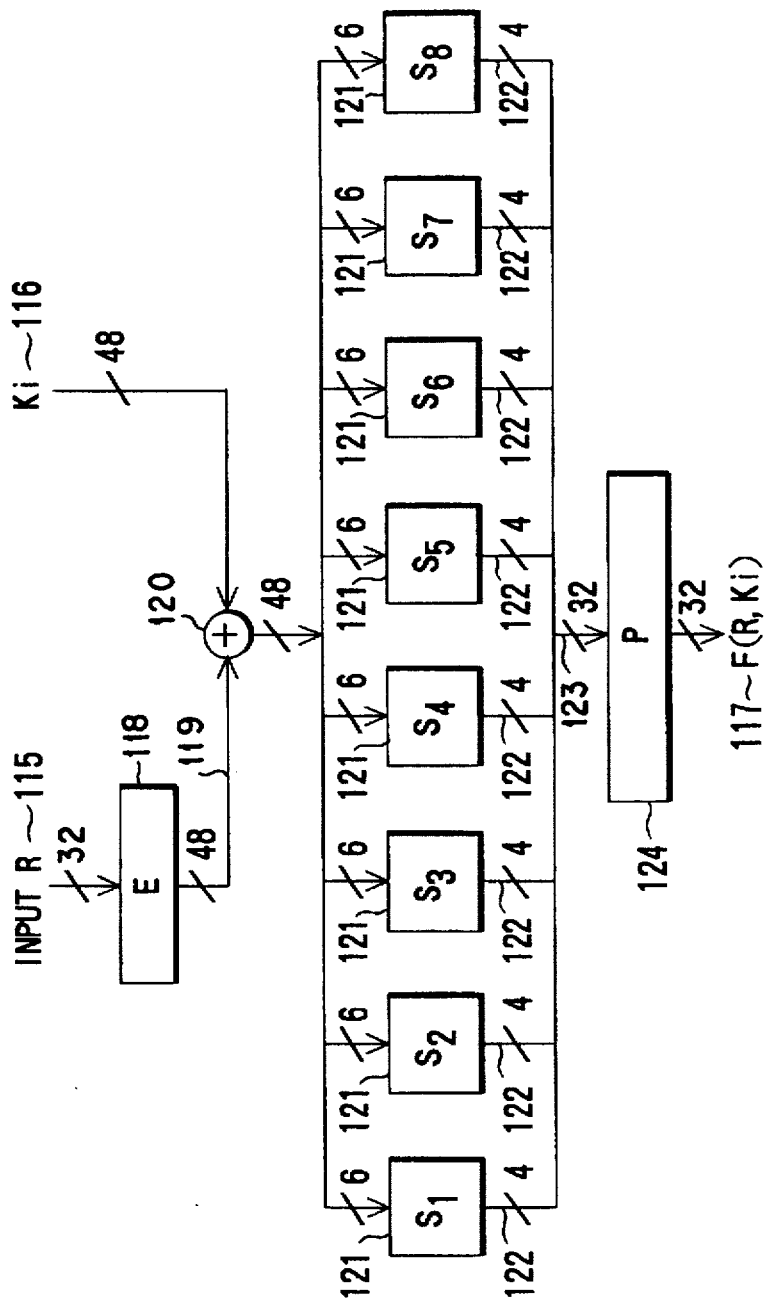
F I G. 11

EXPANSIVE PERMUTATION E
| 32 | 1  | 2  | 3  | 4  | 5  |
|----|----|----|----|----|----|
| 4  | 5  | 6  | 7  | 8  | 9  |
| 8  | 9  | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1  |
F I G. 12
P PERMUTATION
| 16 | 7  | 20 | 21 |
|----|----|----|----|
| 29 | 12 | 28 | 17 |
| 1  | 15 | 23 | 26 |
| 5  | 18 | 31 | 10 |
| 2  | 8  | 24 | 14 |
| 32 | 27 | 3  | 9  |
| 19 | 13 | 30 | 6  |
| 22 | 11 | 4  | 25 |
F I G. 13
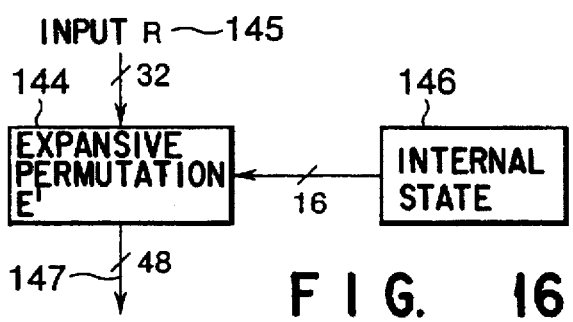
F I G. 16
EXPANSIVE PERMUTATION E'
| X1  | R1  | R2  | R3  | R4  | X2  |
|-----|-----|-----|-----|-----|-----|
| X3  | R5  | R6  | R7  | R8  | X4  |
| X5  | R9  | R10 | R11 | R12 | X6  |
| X7  | R13 | R14 | R15 | R16 | X8  |
| X9  | R17 | R18 | R19 | R20 | X10 |
| X11 | R21 | R22 | R23 | R24 | X12 |
| X13 | R25 | R26 | R27 | R28 | X14 |
| X15 | R29 | R30 | R31 | R32 | X16 |
F I G. 17

S-BOX

S₁

| 14 | 4  | 13 | 1  | 2  | 15 | 11 | 8  | 3  | 10 | 6  | 12 | 5  | 9  | 0  | 7  |
|----|----|----|----|----|----|----|----|----|----|----|----|----|----|----|----|
| 0  | 15 | 7  | 4  | 14 | 2  | 13 | 1  | 10 | 6  | 12 | 11 | 9  | 5  | 3  | 8  |
| 4  | 1  | 14 | 8  | 13 | 6  | 2  | 11 | 15 | 12 | 9  | 7  | 3  | 10 | 5  | 0  |
| 15 | 12 | 8  | 2  | 4  | 9  | 1  | 7  | 5  | 11 | 3  | 14 | 10 | 0  | 6  | 13 |

S₂

| 15 | 1  | 8  | 14 | 6  | 11 | 3  | 4  | 9  | 7  | 2  | 13 | 12 | 0  | 5  | 10 |
|----|----|----|----|----|----|----|----|----|----|----|----|----|----|----|----|
| 3  | 13 | 4  | 7  | 15 | 2  | 8  | 14 | 12 | 0  | 1  | 10 | 6  | 9  | 11 | 5  |
| 0  | 14 | 7  | 11 | 10 | 4  | 13 | 1  | 5  | 8  | 12 | 6  | 9  | 3  | 2  | 15 |
| 13 | 8  | 10 | 1  | 3  | 15 | 4  | 2  | 11 | 6  | 7  | 12 | 0  | 5  | 14 | 9  |

S₃

| 10 | 0  | 9  | 14 | 6  | 3  | 15 | 5  | 1  | 13 | 12 | 7  | 11 | 4  | 2  | 8  |
|----|----|----|----|----|----|----|----|----|----|----|----|----|----|----|----|
| 13 | 7  | 0  | 9  | 3  | 4  | 6  | 10 | 2  | 8  | 5  | 14 | 12 | 11 | 15 | 1  |
| 13 | 6  | 4  | 9  | 8  | 15 | 3  | 0  | 11 | 1  | 2  | 12 | 5  | 10 | 14 | 7  |
| 1  | 10 | 13 | 0  | 6  | 9  | 8  | 7  | 4  | 15 | 14 | 3  | 11 | 5  | 2  | 12 |

S₄

| 7  | 13 | 14 | 3  | 0  | 6  | 9  | 10 | 1  | 2  | 8  | 5  | 11 | 12 | 4  | 15 |
|----|----|----|----|----|----|----|----|----|----|----|----|----|----|----|----|
| 13 | 8  | 11 | 5  | 6  | 15 | 0  | 3  | 4  | 7  | 2  | 12 | 1  | 10 | 14 | 9  |
| 10 | 6  | 9  | 0  | 12 | 11 | 7  | 13 | 15 | 1  | 3  | 14 | 5  | 2  | 8  | 4  |
| 3  | 15 | 0  | 6  | 10 | 1  | 13 | 8  | 9  | 4  | 5  | 11 | 12 | 7  | 2  | 14 |

S₅

| 2  | 12 | 4  | 1  | 7  | 10 | 11 | 6  | 8  | 5  | 3  | 15 | 13 | 0  | 14 | 9  |
|----|----|----|----|----|----|----|----|----|----|----|----|----|----|----|----|
| 14 | 11 | 2  | 12 | 4  | 7  | 13 | 1  | 5  | 0  | 15 | 10 | 3  | 9  | 8  | 6  |
| 4  | 2  | 1  | 11 | 10 | 13 | 7  | 8  | 15 | 9  | 12 | 5  | 6  | 3  | 0  | 14 |
| 11 | 8  | 12 | 7  | 1  | 14 | 2  | 13 | 6  | 15 | 0  | 9  | 10 | 4  | 5  | 3  |

S₆

| 12 | 1  | 10 | 15 | 9  | 2  | 6  | 8  | 0  | 13 | 3  | 4  | 14 | 7  | 5  | 11 |
|----|----|----|----|----|----|----|----|----|----|----|----|----|----|----|----|
| 10 | 15 | 4  | 2  | 7  | 12 | 9  | 5  | 6  | 1  | 13 | 14 | 0  | 11 | 3  | 8  |
| 9  | 14 | 15 | 5  | 2  | 8  | 12 | 3  | 7  | 0  | 4  | 10 | 1  | 13 | 11 | 6  |
| 4  | 3  | 2  | 12 | 9  | 5  | 15 | 10 | 11 | 14 | 1  | 7  | 6  | 0  | 8  | 13 |

S₇

| 4  | 11 | 2  | 14 | 15 | 0  | 8  | 13 | 3  | 12 | 9  | 7  | 5  | 10 | 6  | 1  |
|----|----|----|----|----|----|----|----|----|----|----|----|----|----|----|----|
| 13 | 0  | 11 | 7  | 4  | 9  | 1  | 10 | 14 | 3  | 5  | 12 | 2  | 15 | 8  | 6  |
| 1  | 4  | 11 | 13 | 12 | 3  | 7  | 14 | 10 | 15 | 6  | 8  | 0  | 5  | 9  | 2  |
| 6  | 11 | 13 | 8  | 1  | 4  | 10 | 7  | 9  | 5  | 0  | 15 | 14 | 2  | 3  | 12 |

S₈

| 13 | 2  | 8  | 4  | 6  | 15 | 11 | 1  | 10 | 9  | 3  | 14 | 5  | 0  | 12 | 7  |
|----|----|----|----|----|----|----|----|----|----|----|----|----|----|----|----|
| 1  | 15 | 13 | 8  | 10 | 3  | 7  | 4  | 12 | 5  | 6  | 11 | 0  | 14 | 9  | 2  |
| 7  | 11 | 4  | 1  | 9  | 12 | 14 | 2  | 0  | 6  | 10 | 13 | 15 | 3  | 5  | 8  |
| 2  | 1  | 14 | 7  | 4  | 10 | 8  | 13 | 15 | 12 | 9  | 0  | 3  | 5  | 6  | 11 |

F I G. 14

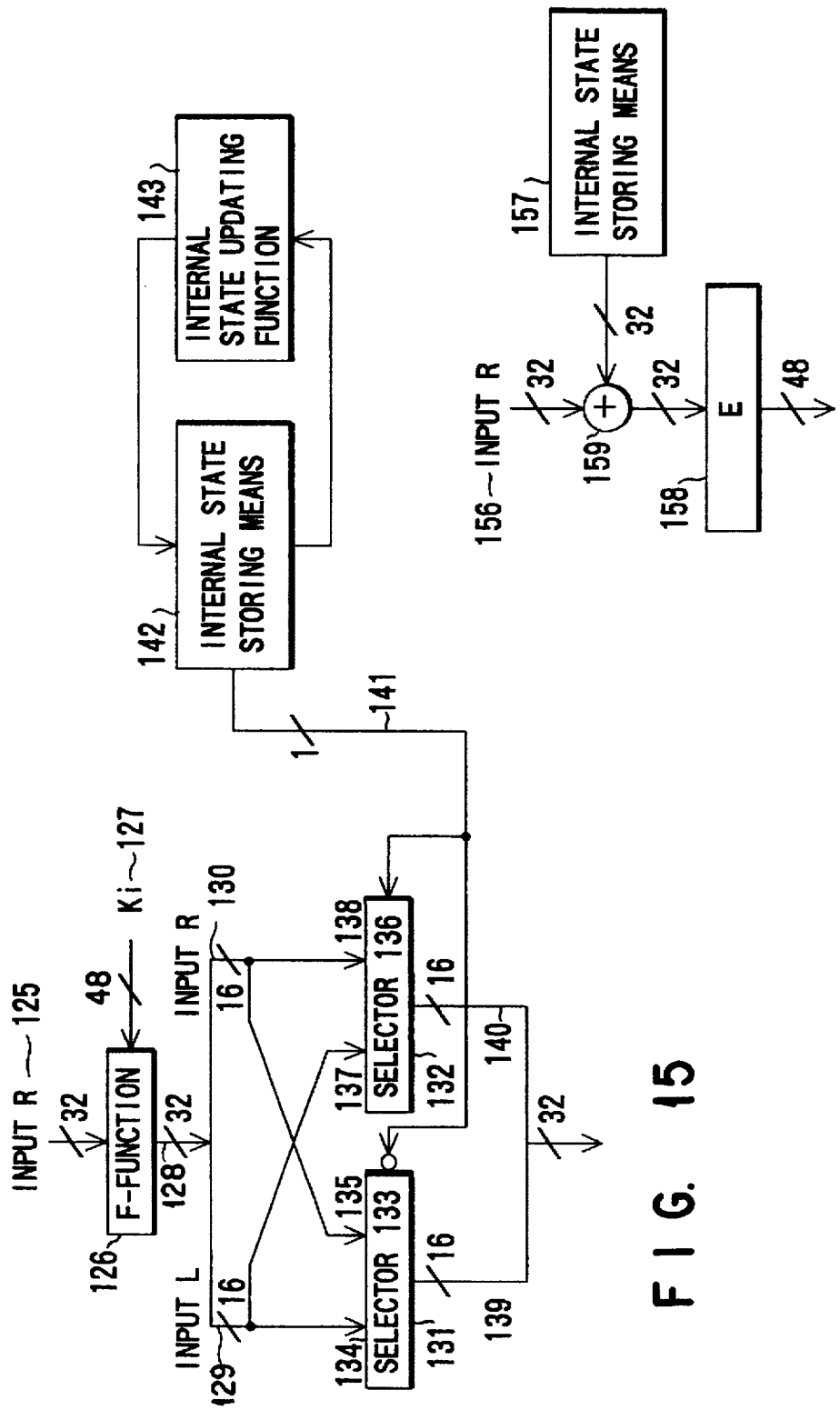
F I G. 15
F I G. 19

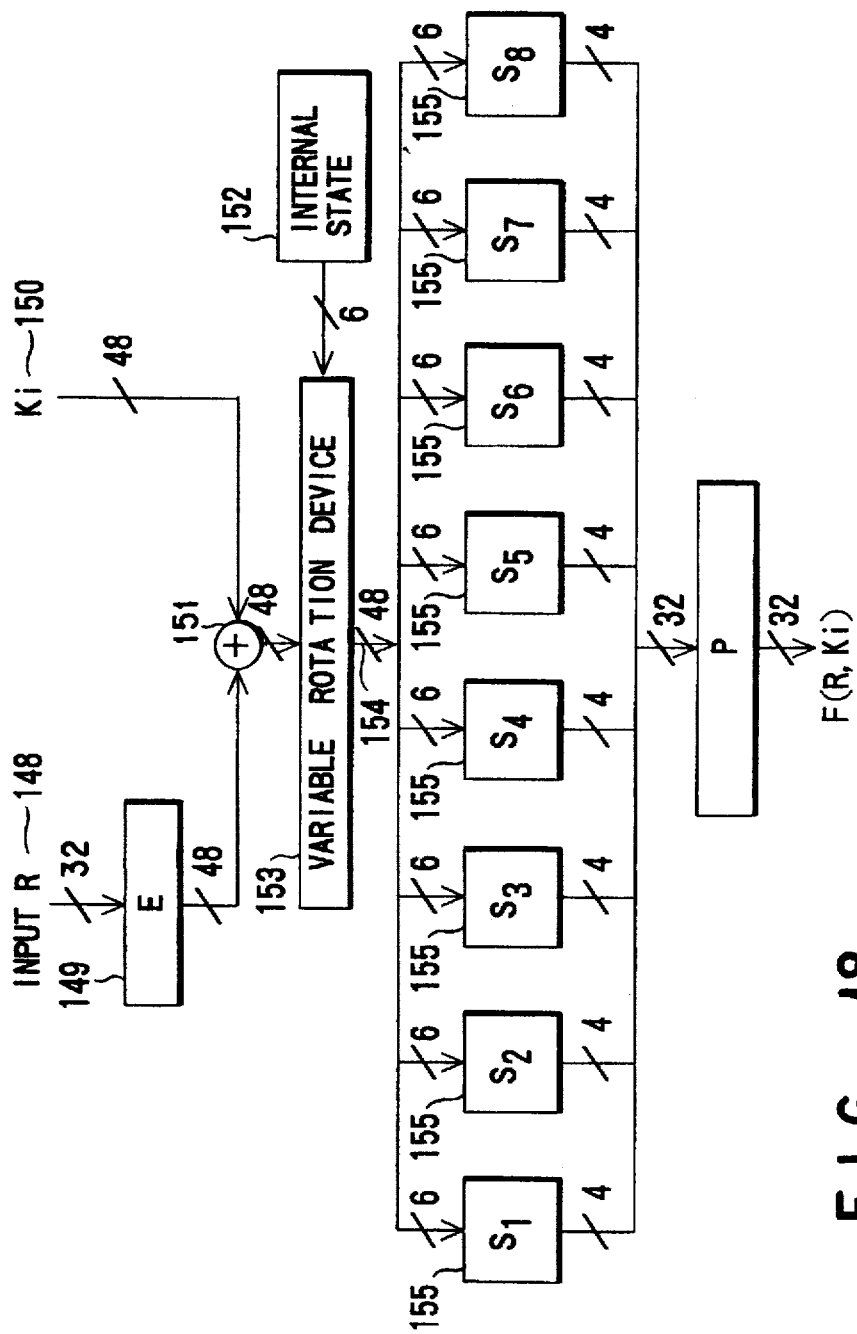
F I G. 18

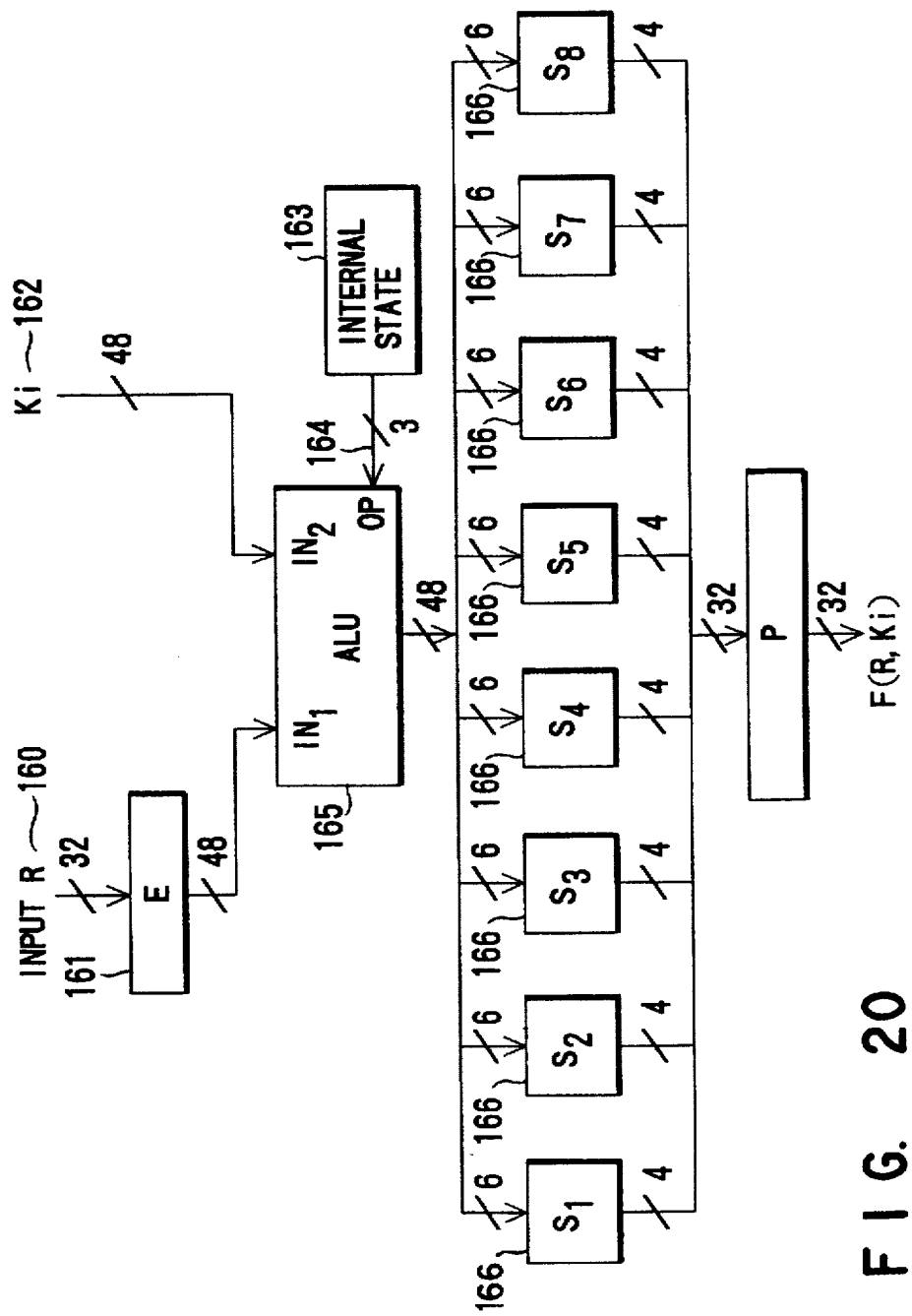
F I G. 20

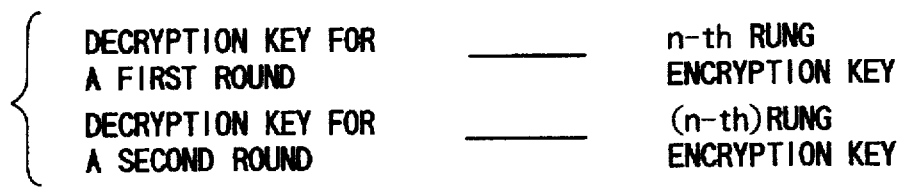
F I G. 23
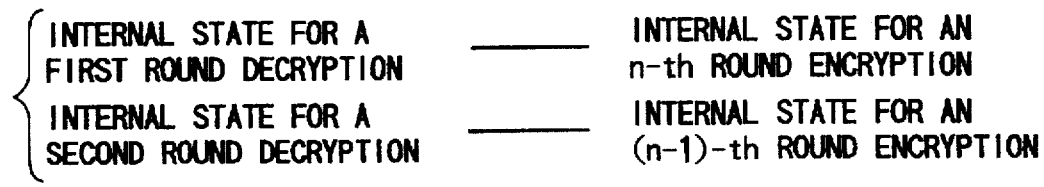
F I G. 24
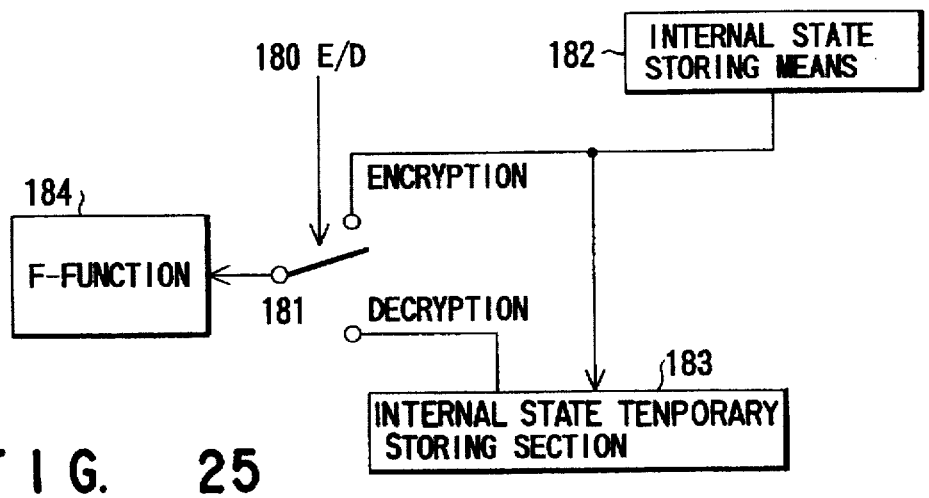
F I G. 25
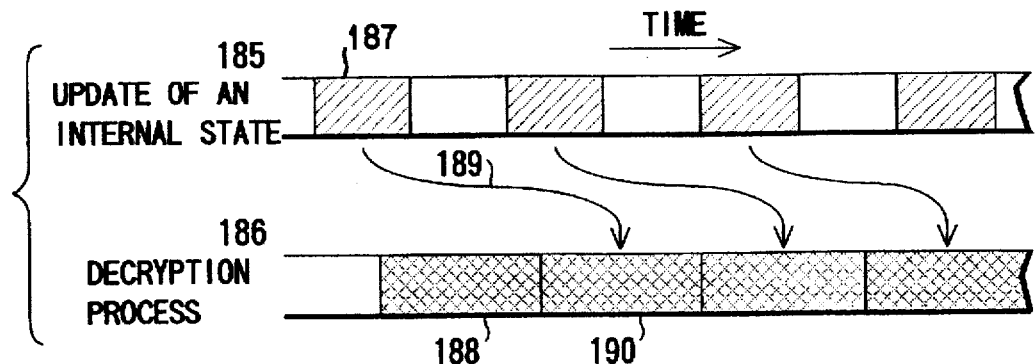
F I G. 26

ENCRYPTION APPARATUS AND METHOD CAPABLE OF CONTROLLING ENCRYPTION PROCESS IN ACCORDANCE WITH AN INTERNAL STATE

BACKGROUND OF THE INVENTION

1. Field of the Invention

The present invention relates to an encryption apparatus and method, and particularly to an encryption apparatus and method, which can improve safety of a ciphertext obtained in a block encryption of a Feistel type.

2. Description of the Related Art

An encryption method has been known in which a cipher having relatively low safety is regarded as a round-function and safety of the cipher is improved by stacking a plurality of the round-functions. Such a cipher is called a product encryption. Particularly, since the block encryption of the Feistel type can be used in common in both an encrypting circuit and a decrypting circuit, there is an advantage in that the size of the apparatus can be reduced. Such an encryption apparatus is disclosed in "Modern Encryption Theory" written by Shinichi Ikeno, and Kenji Koyama, published by The Institute of Electronics, Information and Communication Engineers.

Also, Japanese Patent Application KOKAI Publications Nos. 51-108701 and 51-108702 disclose the basic concept of an Encryption of DES (Data Encryption Standard) type, which is known as a typical encryption of the block encryption of the Feistel type.

Moreover, Japanese Patent Application KOKAI Publication No. 6-266284 discloses a method in which a temporary key, serving as a bit string, for controlling an encryption, is updated every time the encryption is executed, thereby a large number of ciphertexts, which are obtained by encrypting with the same key in encrypting a long plaintext, are not provided to an operator.

As a useful method for decrypting the above-mentioned block encryption of the Feistel type, a differential attack has been known in which attention is paid to the relationship between input and output in a transform section so as to analyze the ciphertext. In order to protect the ciphertext from the above differential attack, the number of rungs of the transform section may be increased.

However, the following problems occurred in the above-mentioned prior art.

More specifically, if the number of rungs of the transform section is increased in order to protect the ciphertext from the differential attack, the processing speed is decreased. Conversely, if the number of rungs of the transform section is reduced in consideration of the processing speed, the ciphertext is decrypted by the differential attack.

SUMMARY OF THE INVENTION

An object of the present invention is to provide an encryption apparatus and method which can improve safety of a ciphertext even in a case where an apparatus is structured by a transform section having a small number of rungs in consideration of a processing speed.

In order to achieve the above object, according to a first aspect of the present invention, there is provided an encryption apparatus including a plurality of rungs of transform sections, each transform section comprising storing means for storing an internal state; internal state updating means for updating the internal state stored in the storing means; and encrypting means for executing an encryption upon receipt of data to be encrypted, an encryption key, and the internal state stored in the storing means, wherein the internal state stored in the storing means is updated by the internal state updating means every time the encryption is executed by the encryption means.

According to a second aspect of the present invention, there is provided an encryption apparatus including a plurality of rungs of transform sections, each transform section comprising storing means for storing an internal state; internal state updating means for updating the internal state stored in the storing means; encrypting means for executing encryption upon receipt of data to be encrypted, an encryption key, and the internal state stored in the storing means; and output controlling means for controlling an output of the encrypting means in accordance with the internal state stored in the storing means, wherein the internal state stored in the storing means is updated by the internal state updating means every time the encryption is executed by the encrypting means.

According to a third aspect of the present invention, there is provided an encryption method including a plurality of transform steps, each transform step comprising a storing step for storing an internal state; an internal state updating step for updating the internal state stored by the storing step; and an encrypting step for executing an encryption upon receipt of data to be encrypted, an encryption key, and the internal state stored by the storing step, wherein the internal state stored by the storing step is updated by the internal state updating step every time the encryption is executed by the encryption step.

According to a fourth aspect of the present invention, there is provided an encryption method including a plurality of transform steps, each transform step comprising a storing step for storing an internal state; an internal state updating step for updating the internal state stored by the storing step; an encryption step for executing an encryption upon receipt of data to be encrypted, an encryption key, and the internal state stored by the storing step; and an output controlling step for controlling an output obtained by the encryption step in accordance with the internal state stored by the storing step, wherein the internal state stored by the storing step is updated by the internal state updating step every time the encryption is executed by the encryption step.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a view showing the structure of a round-function of one embodiment of the present invention;

FIG. 2 is a view showing an example of the structure of a product encryption in which n number of rungs of round-functions are juxtaposed;

FIG. 3 is a view showing a passage of an internal state, which is sequentially updated by an internal state updating function;

FIG. 11 is a view showing the specific structure of F-function in the DES encryption;

FIG. 12 is a permutation table of expansive permutation E;

FIG. 13 is a table showing the content of P permutation;

FIG. 14 is a view showing the content of an S-box;

FIG. 15 is a view showing the structure, serving as an modification of the present invention, for improving safety of the DES encryption;

FIG. 16 is a view showing another modification to improve the safety of the DES encryption;

FIG. 17 is an expansive permutation table of the modification of FIG. 16;

FIG. 18 is a view showing still another modification to improve the safety of the DES encryption;

FIG. 19 is a view showing still another modification to improve the safety of the DES encryption;

FIG. 20 is a view showing still another modification to improve the safety of the DES encryption;

FIG. 23 is a view showing the correspondence between a decryption key and an encryption key in each rung of the encryption of a Feistel type;

FIG. 24 is a view showing the correspondence between an internal state for a decryption and an internal state for an encryption in each rung of the encryption of a Feistel type;

FIG. 25 is a view showing the structure in which the encryption apparatus of the present invention and the decryption apparatus are combined; and FIG. 26 is a time chart of a pipe-lined decryption processing.

DETAILED DESCRIPTION OF THE PREFERRED EMBODIMENTS

Figure 4:
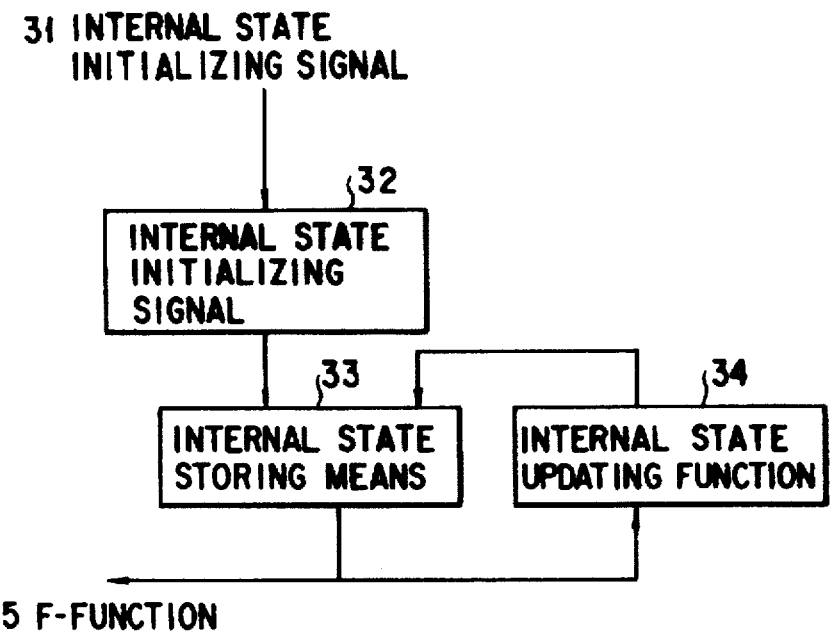
FIG. 4 is a view explaining an operation in a case where the round-function of FIG. 1 has an internal state initializing signal.

The following will specifically explain the embodiments of the present invention with reference to the drawings.

FIG. 1 is a view showing the structure of a round-function 8, serving as a transform section, to which the present invention is applied. The round-function 8 comprises an F-function 1, serving as encryption means for executing a predetermined encryption upon receipt of a plaintext 4 to be encrypted, an encryption key 5, and an internal state 6, so as to output an output 7, internal state storing means 2 for storing the internal state 6, and an internal state updating function 3 for updating the internal state 6 every time the encryption is executed by the F-function 1, that is, at the same time as the encryption process. FIG. 1 shows the round-function of the first rung. As for the round-functions of the second rung and the following, an output of the round-function of the previous rung is input in place of the plaintext 4.

According to the above-mentioned structure, even in a case where the same plaintext and encryption key are input, the outputs are changed in accordance with the updatable internal state. Due to this, it is possible to usefully protect against a differential attack which is based on the analysis of the relationship between the input and the output of the round-function. Also, the safety of the round-function can be improved. Moreover, in consideration of the same degree of safety, the apparatus can be structured by the round-function having a small number of rungs. Furthermore, as the internal state is updated at the same time as the F-function encryption processing, the processing efficiency of the entire round-function is substantially unchanged, so that the processing speed can be increased to be equivalent to the decrease in the number of rungs of the round-functions.

FIG. 2 is a view showing an example of the structure of a product encryption in which n number of rungs of round-functions are juxtaposed. In the figure, an encryption key 16 is input to a key schedule section 17 to be transformed to n number of expanded keys 1 to n, and n number of expanded keys 1 to n are input to round-functions 12 to 15 of n-rungs, respectively. According to the above-mentioned structure, a plaintext 11 is output as a ciphertext 18 after the encryption processing is executed thereto by the round-functions of n-rungs. In this case, the plaintext 11 and the ciphertext 18 may be set to be a fixed length, or a variable length. Moreover, the length of the plaintext 1 and that of the ciphertext 18 may not be the same as each other.

FIG. 3 is a view showing a passage of an internal state, which is sequentially updated by the internal state updating function 3. More specifically, an internal state 1 (22) is first set to be equal to an initial state 21. When the internal state 1 (22) is updated by an internal state updating function 23 so as to be set to an internal state 2 (22), then the internal state 2 (22) is updated by the internal state updating function 23. In this way, the internal state is sequentially updated. In a case where the internal state updating function 23 is a one-directional function, the internal state can only advance forward so that the internal state having a smaller number than k is not known even if an internal state k is known to a third person and the internal state having a larger number than k is decrypted. Therefore, according to the present invention, the safety of the round-function can be kept.

FIG. 4 is a view explaining an operation in a case where the round-function 8 of FIG. 1 has an input section for inputting an internal state initializing signal 31. An internal state stored in an internal state storing means 33 is transmitted to an F-function 35 and an internal state updating function 34 so as to be updated to a new internal state. At this time, if the internal state initializing signal 31 supplied from the outer unit is input to an internal state initialization control section 32, the internal state initialization control section 32 initializes the internal state stored in the internal state storing means 33.

As mentioned above, according to the above-mentioned embodiment, the initialization of the internal state can be controlled from the outer unit. In this case, in consideration of the safety, the internal state initialization control section 32 preferably has a function of monitoring the frequency of the initialization. For example, it is preferable to have a monitor mechanism to monitor that only one initialization is being executed during one encryption processing.

Figure 5:
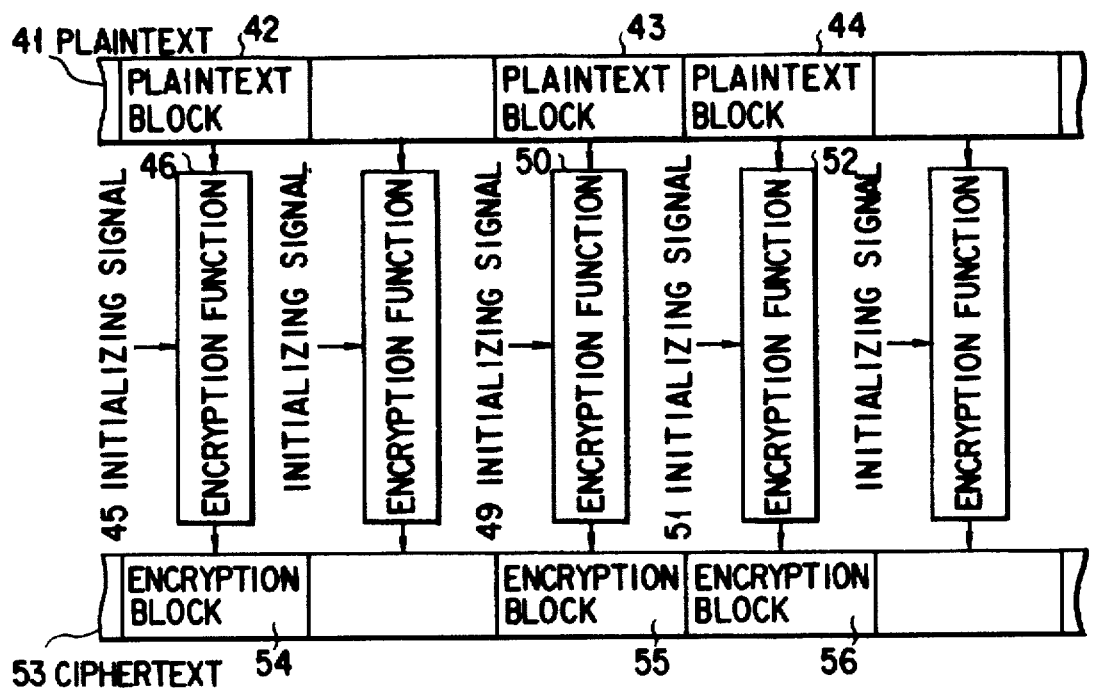
FIG. 5 is a view explaining an operation when an encryption apparatus is used under a block encryption mode.

FIG. 5 is a view explaining an operation when an encryption apparatus is used under a block encryption mode. In a case where a plaintext 41 is formed of a plurality of plaintext blocks 42, 43, 44, the plaintext 41 of each of the blocks is encrypted by each of encryption functions 46, 50 and 52, so as to be transformed to each of encryption blocks 54, 55, and 56. Then, these blocks are juxtaposed to form a ciphertext 53.

Also, the internal state of each of the encryption functions 46, 50, 52 of each of the blocks can be initialized by each of initialization signals 45, 49, 51. Thereby, for example, if the plaintext block 43 and the plaintext block 44 have the same contents A, A, these plaintext blocks 43 and 44 are transformed to encryption blocks 55 and 56 having the same contents B, B, when these plaintext blocks are encrypted.

As mentioned above, according to the above-mentioned embodiment, the encryption apparatus having the initializing function can be operated under the block encryption mode.

Figure 6:
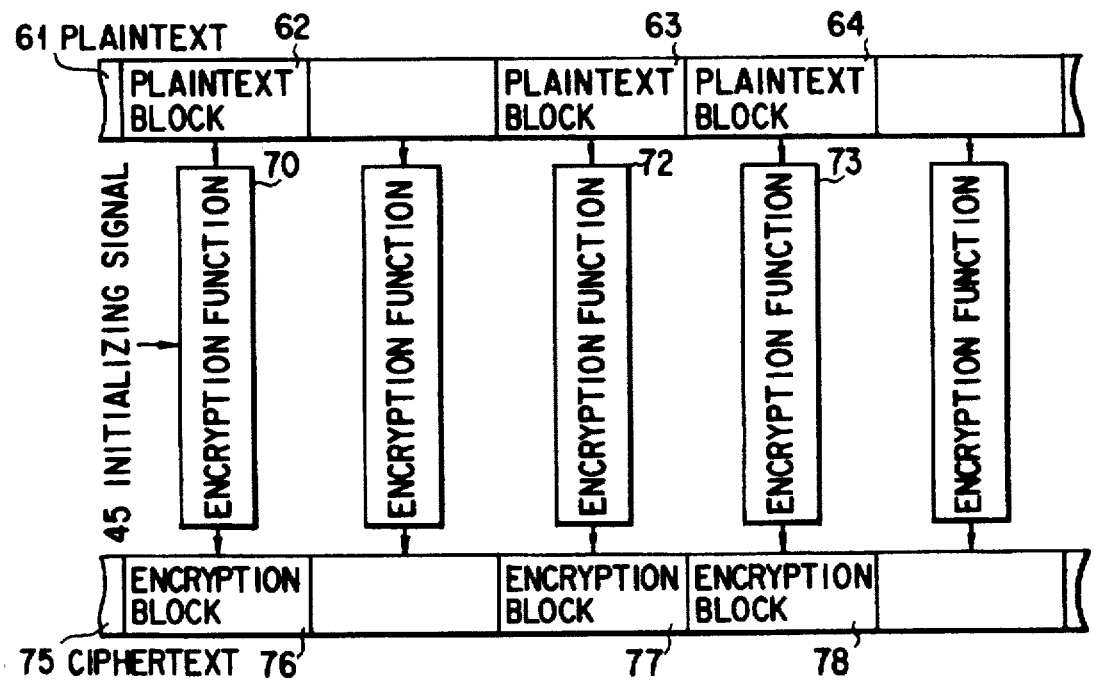
FIG. 6 is a view explaining an operation when the encryption apparatus is used under a stream encryption mode.

FIG. 6 is a view explaining an operation when the encryption apparatus is used under a stream encryption mode. In a case where a plaintext 61 is formed of a plurality of plaintext blocks 62, 63, 64, the plaintext 61 of each of the blocks is encrypted by each of encryption functions 70, 72 and 73, so as to be transformed to each of encryption blocks 76, 77, and 78. Then, these blocks are juxtaposed to form a ciphertext 75. In this embodiment, prior to the encryption the internal state of the encryption function 70 is initialized once by the initializing signal 65. Therefore, for example, even in a case where the plaintext blocks 63 and 64 have the same contents A, A, these plaintext blocks are transformed to the encryption blocks 77 and 78 having the different contents B, B', when these plaintext blocks 63 and 64 are encrypted. In other words, the relationship of B≠B' is established.

According to the above-mentioned embodiment, the encryption apparatus having the initialization function can be operated under the stream encryption mode.

Figure 7:
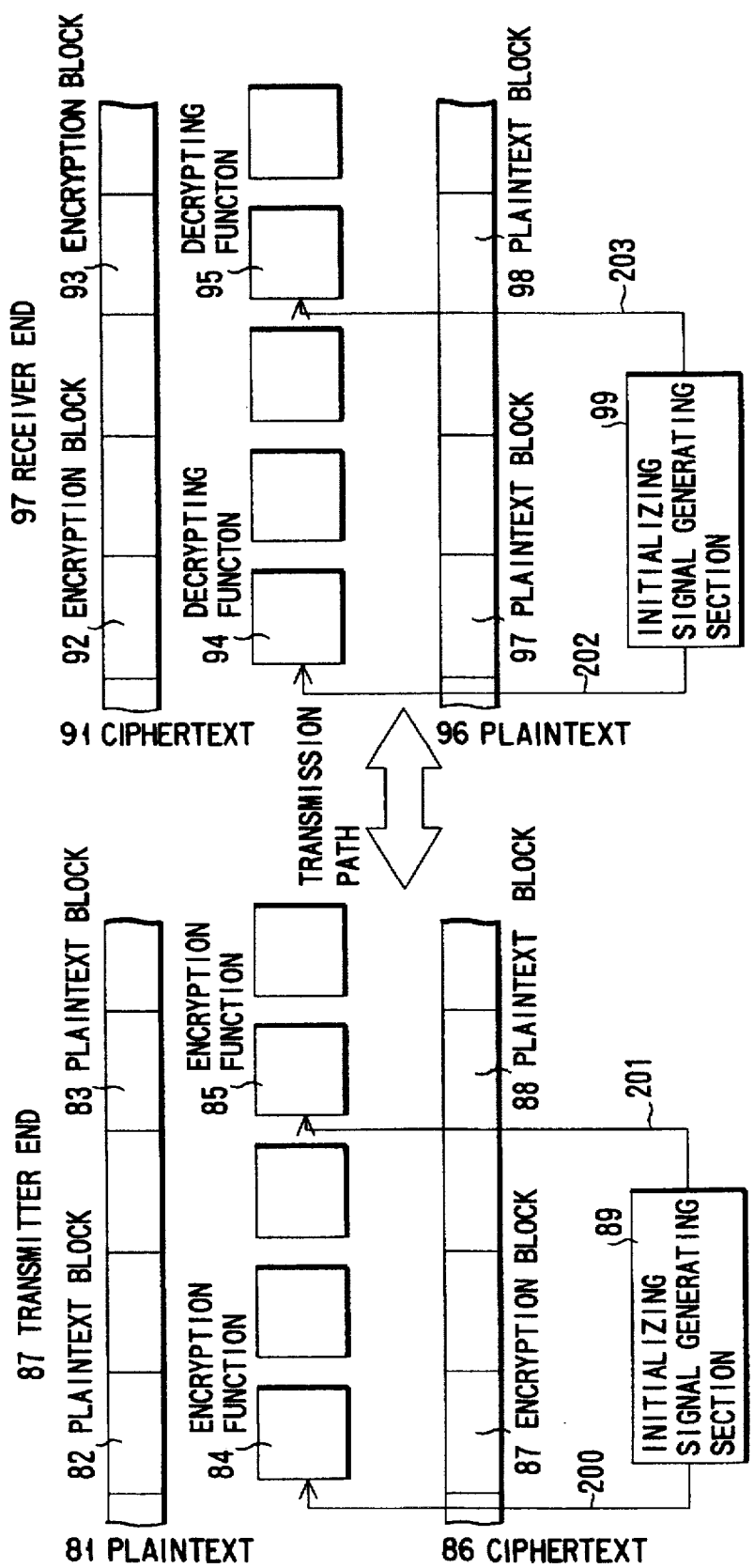
FIG. 7 is a view explaining a function in a case where the present invention is applied to a secret transmission.

FIG. 7 is a view explaining a function in a case where the present invention is applied to a secret transmission. In a transmitter end 87, a plaintext 81 is formed of a plaintext blocks 82 and 83. The plaintext 81 of each of the blocks is encrypted by each of encryption functions 84 and 85, thereby obtaining encryption blocks 87 and 88. The encryption blocks 87 and 88 are transmitted to a receiver end 97 through a transmission path 90. In the receiver end 97, a ciphertext 91 is decomposed into an encryption block 92 and an encryption block 93, and each of the encryption blocks 92 and 93 is decrypted by each of decryption functions 94 and 95, thereby obtaining plaintext blocks 97 and 98. Then, these plaintext blocks 97 and 98 are juxtaposed, so that an original plaintext 96 is restored.

At this time, initializing signal generating sections 89 and 99 are provided at the transmitter end 87 and the receiver end 97, respectively. Then, the internal states of the encryption functions 84 and 85 and the internal states of the decryption functions 94 and 95 are initialized at predetermined timing by initializing signals 200, 201, 202, 203, respectively. In this case, the initializing timing is built in the initializing signal generating sections 89 and 99. Moreover, in order to reduce an amount of transmission of initializing timing, the initializing signal generating sections 89 and 99 may be structured by a random number generator, and only the species of the random number may be replaced.

According to the above-mentioned embodiment, the receiver end 97 must have the initializing timing as well as the decryption key in order to restore the same plaintext as the plaintext of the transmitter end 87. Due to this, in order to decrypt the ciphertext, an unfair interceptor must have the initializing timing as well as the decryption key. Therefore, according to the present invention, the secret transmission can be more safely executed.

Figure 8:
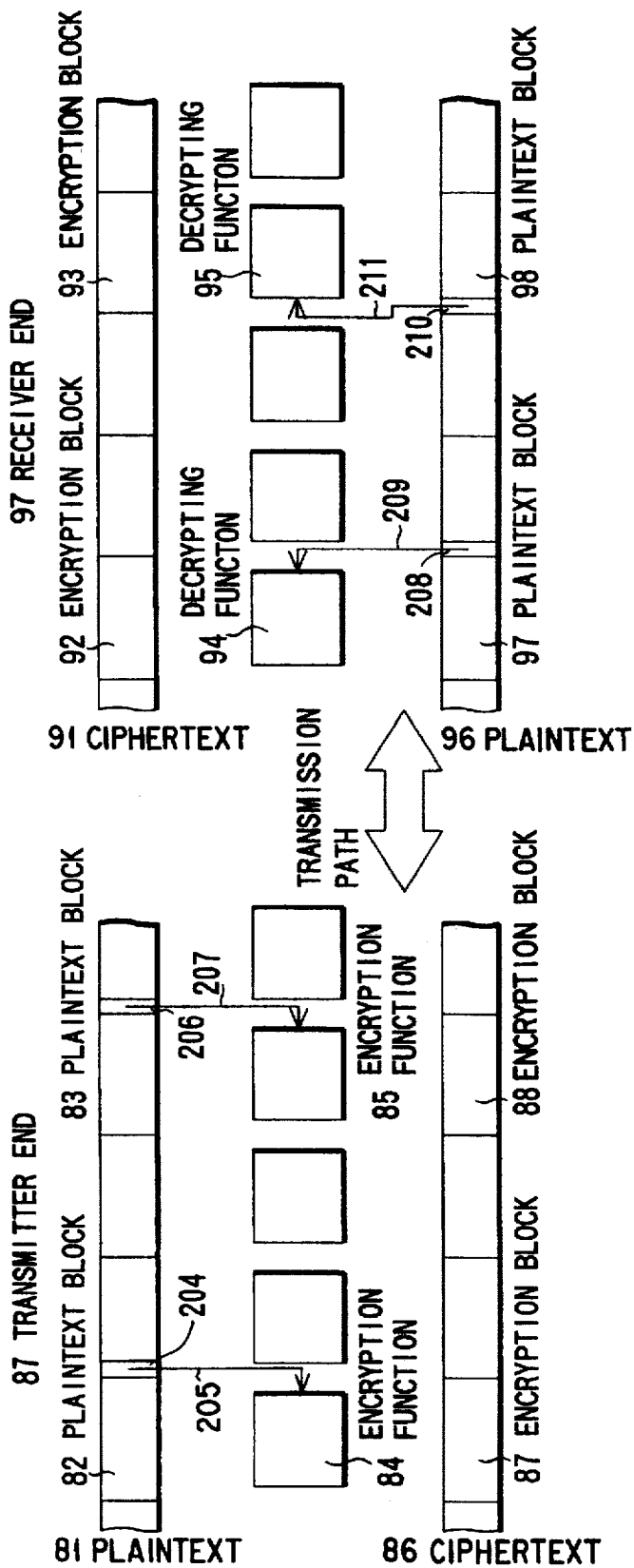
FIG. 8 is a view showing another embodiment in a case where the present invention is applied to the secret transmission.

FIG. 8 is a view showing the another embodiment in a case where the present invention is applied to the secret transmission.

In this embodiment, at the transmission end 87, special marks 204 and 206, serving as designation data for designating the initialization, are added to the plaintext blocks 82 and 83. Each of the plaintext blocks 82 and 83, constituting the plaintext 81, is transformed to each of the encryption blocks 87 and 88 by each of the encryption functions 84 and 85. Then, the encryption blocks 87 and 88 are juxtaposed, thereby obtaining the ciphertext 86. At this time, upon detecting the special mark 204 of the plaintext block 82 or the special mark 206 of the plaintext block 83, the internal state of each of the encryption functions 84 and 85 is initialized by each of initializing signals 205 and 207. The ciphertext 86 is transmitted to the receiver end 97 through the transmission path 90.

At the receiver end 97, the received ciphertext 91 is decomposed into the encryption block 92 and the encryption block 93, and each of the encryption blocks 92 and 93 is transformed to each of the plaintext blocks 97 and 98 by each of decryption functions 94 and 95. In this case, upon detecting special marks 208 and 210 for designating the initialization of the plaintext blocks 97 and 98, the internal state of each of the decryption functions 94 and 95 is initialized by each of initializing signals 209 and 211. In this case, the special marks 208 and 210 of the plaintext blocks 97 and 98 may be removed as necessary, and the plaintext blocks 97 and 98 with no special mark may be juxtaposed, thereby obtaining the plaintext 96.

In the above-mentioned embodiment, since timing for initializing the internal state is included in the plaintext, it is not necessary for timing of initialization to be set in advance between the transmitter end and the receiver end.

Figure 9:
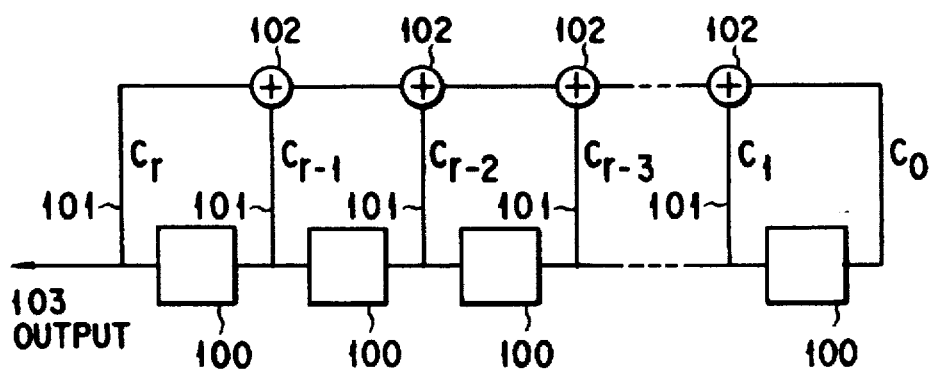
FIG. 9 is a view showing the specific structure of the internal state updating function of FIG. 1.

FIG. 9 is a view showing the specific structure of the internal state updating function 3 of FIG. 1. The internal state updating function 3 comprises a linear register formed of a storage element 100 and an adder 102. The storage element 100 is an element, which can store one bit data, and for example, a D flip-flop is used.

Different kinds of characteristic polynomials are obtained according to whether or not the respective taps 101 are connected to each other. For example, if the state that the taps 101 are connected to each other is set to 1 and the state that the taps 101 are not connected is set to 0, the following characteristic polynomial can be obtained.

$$C_r x^r + C_{r-1} x^{r-1} + \ldots + C_1 x + C_0$$

Particularly, in a case where a representative polynomial is a primitive polynomial, it has been known that a linear shift register outputs a maximum string length ("Coding Theory" written by Hideki Imai, published by The Institute of Electronics, Information and Communication Engineers). The following primitive polynomial is known as an example.

$$X^{31} + X^3 + 1$$

Every time a clock signal is input to the linear shift register, the storage content of the storage element 100 is updated by the content of the storage element 100 on the left, then, the result of the addition, which is executed by the adder 102 in accordance with the connection state of the tap 101, is input to the storage element 100 on the furthest left, and output as an output 103.

The following will explain the another method for improving the safety of the well-known block encryption, that is, DES encryption.

Figure 10:
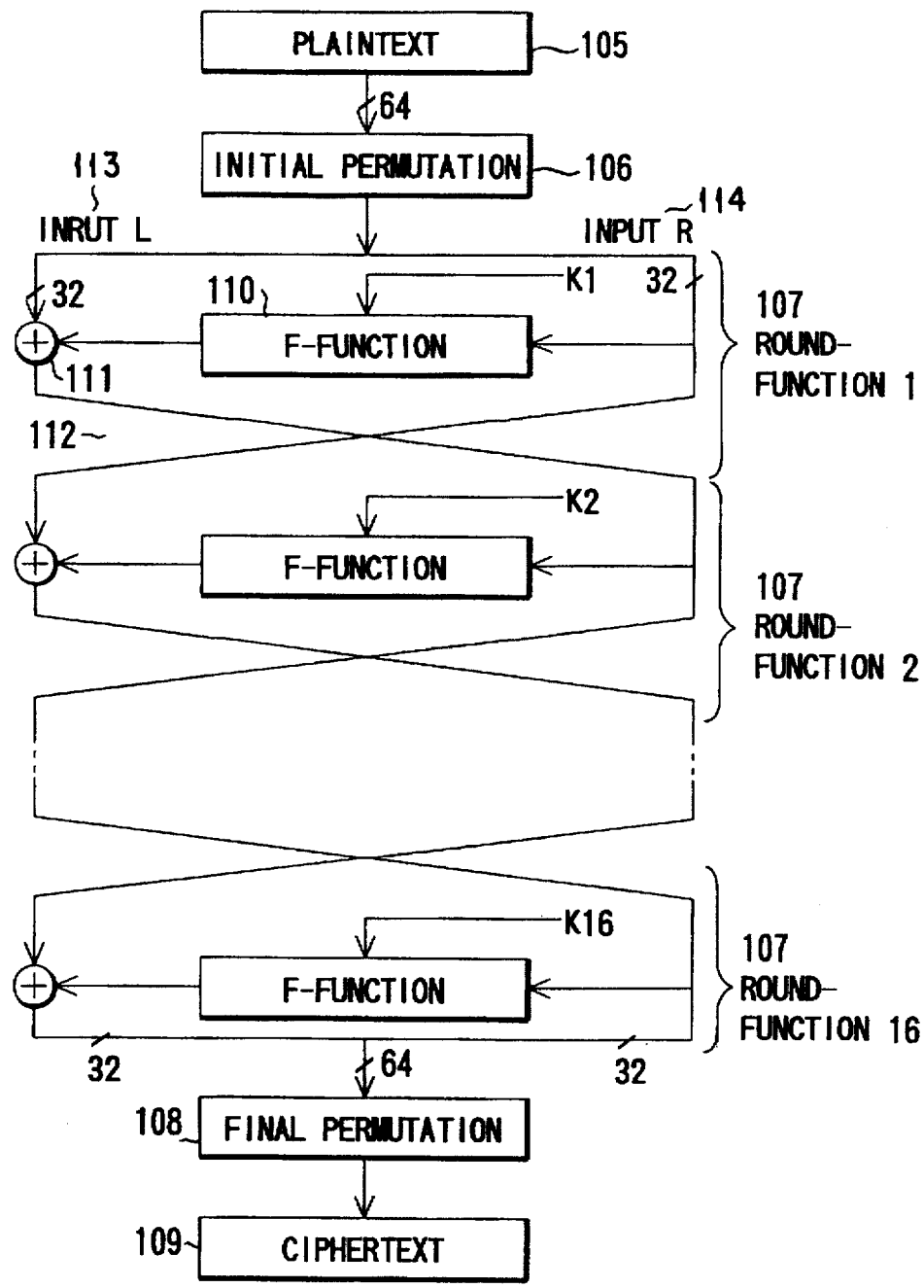
FIG. 10 is a view showing the entire structure of a DES encryption.

First, the outline of the DES encryption will be explained. FIG. 10 is a view explaining the entire structure of the DES encryption. Concerning a 64-bit plaintext 105 to be encrypted, the order of bits is rearranged by an initial permutation 106 so that the these bits are divided to upper 32 bits (input L113) and the lower 32 bits (input R114). Thereafter, the plaintext 105 is transformed 16 times by the 16-rung round functions (1 to 16) 107 having the same structure, and a final permutation 108 is implemented, thereby obtaining a ciphertext 108.

Each round function 107 comprises an F-function 110, an exclusive-OR 111, and right and left transform sections 112. Inputs Li and Ri of the round function of i-th rung are transformed to inputs of the round function of (i+1)-th rung, as shown in the following equations wherein the key of i-th rung is Ki.

$$Ri+1 = Li\ XOR\ F\ (Ri,\ Ki)$$

$$Li+1 = Ri$$

FIG. 11 shows the specific structure of the F-function of the DES encryption.

The F-function has two inputs, i.e., a 32-bit input R115 and a 48-bit key K116, and one output 117 of 32 bits.

The operation of the above-described F-function will be explained along the flow of data.

The input 32-bit input R115 is expanded to 48-bit data by an expansive permutation E (118), that is, E transform. FIG. 12 is a permutation table of the expansive permutation E showing from the upper left which bit of the input corresponds to each output bit, which is E-transformed. For example, since the upper left of the permutation table of FIG. 12 is 32, the first bit of the E-transformed output corresponds to the 32nd bit of the input. The second bit of the E-transformed output corresponds to the first bit of the input. The same can be applied to the output bits that follow.

An exclusive-OR of an output 119 of the E-transform and a key Ki 116 is obtained by an exclusive-OR 120. The obtained result is divided to eight groups each having six bits to be input to respective S-boxes (S1 to S8) 121, serving as substitution sections. The S box 121 is a substitution table having 6-bit input and 4-bit output, and FIG. 14 shows an example of such a substitution table.

Eight outputs 122 each having four bits of the S box 121 are bundled to be output as one output 123 of 32 bits. The order of the bits is rearranged by a P transform 124, thereby obtaining a 32-bit output 117 of F-function.

FIG. 13 is a table showing the content of the P permutation. Similar to the expansive permutation E of the table of FIG. 12, FIG. 13 shows from the upper left which bit of the input corresponds to each output bit, which is E-transformed. For example, the first bit of the output of P-transform 124 corresponds to the 16th bit of the input, and the second bit of the output corresponds to the seventh bit of the input. The same can be applied to the output bits that follow.

FIG. 15 is a view showing the structure, serving as a modification of the present invention, for improving safety of the DES encryption. In this modification, the conventional F-function 110 of FIG. 10 is replaced with the structure of FIG. 15, so as to improve the safety of the ciphertext.

More specifically, an input R 125 and a key Ki 127 are input to a conventional F-function 126 of the DES encryption to be transformed to a 32-bit output 128. The output 128 is divided to an input L 129 and an input R 130, each having 16 bits. Then, the input L 129 is input as a first input 134 to a selector 133, and also input as a first input 137 to a selector 134. Moreover, the input R 130 is input as a second input 135 to a selector 132, and also input as a second input 138 to a selector 132.

The selector 131 outputs either input 134 or input 135 as an output 139 under the control of a control input 133. The selector 132 also outputs either input 137 or input 138 as an output 140 under the control of a control input 136. In this case, since two control inputs 133 and 136 are set to be a negative logic with each other, these control inputs are always different inputs. In other words, Whether or not the input L 129 and the input R 130 are replaced with each other is determined in accordance with a one bit control line 141 so as to obtain an output of the F-function 129.

Since the control line 141 is connected to the internal state 142, whether or not the input L 129 and the input R 130 are replaced with each other depends on the internal state 142. The internal state 142 is updated by an internal state updating function 143 every time encryption is implemented.

The above-mentioned structural method is not limited to the DES encryption, and can be applied to the other block encryption having the same structure as the above-mentioned structure.

In the above-mentioned embodiment, the selectors are provided in the back stage of the F-function. However, the selectors may be provided in the front stage of the F-function.

FIG. 16 is a view showing another modification to improve the safety of the DES encryption. The expansive permutation E 118 of FIG. 11 is replaced with an expansive permutation E' 144, whose contents depend on an internal state 146, thereby improving the safety of the ciphertext. In FIG. 16, an input R145 is input to the expansive permutation E' 144, whose contents depend on the internal state 146, and is output as an output 147.

FIG. 17 is a view showing a table of such an expansive permutation E'. In FIG. 17, Xi is an input from the internal state 146, and Ri is an input from an input R 145. It shows which bit of the input corresponds to each E'-transformed output bit from the upper left. For example, the first bit of the output corresponds to the first bit of the input from the internal state 146, and the second bit of the output corresponds to the first bit of the input R. In this case, a permutation other than the permutation shown in FIG. 17 may be used as a permutation of the expansive permutation E'.

FIG. 18 is a view showing still another modification to improve the safety of the DES encryption. In this case, an input to the S-box is dynamically changed in accordance with an internal state, so as to improve the safety of the DES encryption.

More specifically, when an expansive permutation E 149 receives an input R 149, it performs expansive-permutation E 149 to the input R 149, and outputs an output. Between this output and a key Ki 150, an exclusive-OR operation is performed at an exclusive-OR section 151. The output of the exclusive-OR section 151 is supplied to a variable rotation device 153, which rotates the output 151, i.e. shifts its bit position by a predetermined amount. The variable rotation device 153 provides a shift amount variable in accordance with the value of an internal state 152. Thereafter, the output 154 of the variable rotation device 153 is input to S-boxes (S1 to S8) 155.

As a variable rotation, a high-speed mounting method using a barrel shifter is known. If the number of rotating bits is too small or too large, the effect of the encryption is lowered. Due to this, the number of rotating bits may be limited to a predetermined range. For example, if the number of rotating bits is set to the range of 8 to 40 bits, the rotating bit of 32 bits is obtained. In this case, an output from the internal state 152 may be 5 bits.

FIG. 19 is a view showing still another modification to improve the safety of the DES encryption. An exclusive-OR operation is implemented between an input R 156 and the output of an internal state 157 at an exclusive-OR section 159 and the result is input to an expansive permutation E 158. The exclusive-OR operation can be replaced with another operations such as 32-bit addition and subtraction.

FIG. 20 is a view showing still another modification to improve the safety of the DES encryption. In the conventional DES encryption, an encryption key is added using an exclusive-OR operation in the F-function. However, the safety of the DES encryption can be further improved by using another operations. In FIG. 20, an expansive permutation is performed to an input 160R at an expansive permutation E 161. And, a calculation between an output of the expansive permutation E 161 and a key Ki 162 is executed at an AUL 165. What kind of calculation is performed is designated in accordance with an output 164 of an internal state 163. An output of the AUL 165 is divided to eight groups each having six bits, and is input to S-boxes (S1 to S8) 166. The operations that follow are the same as the conventional operation of the DES encryption.

Figure 21:
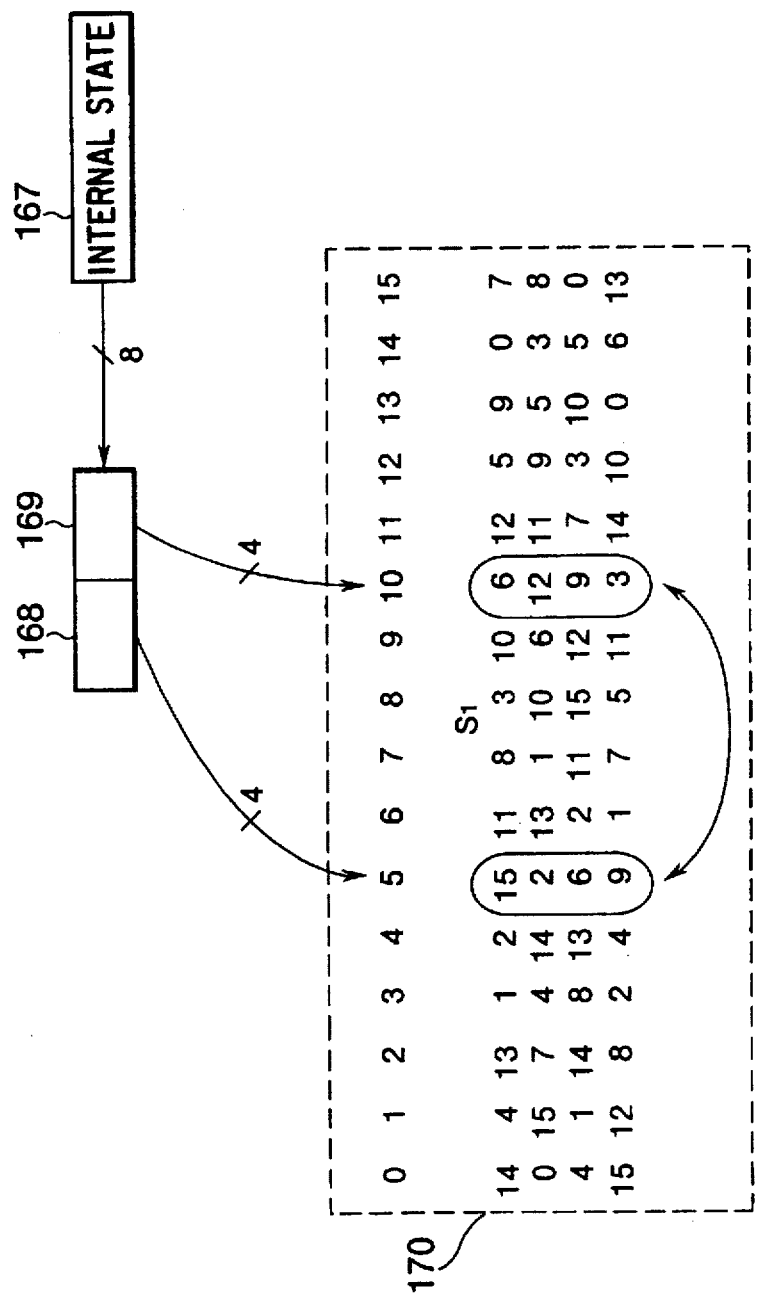
FIG. 21 is a view showing still another modification to improve the safety of the DES encryption.

FIG. 21 is a view showing still another modification to improve the safety of the DES encryption. In this modification, the safety of the DES encryption is improved by exchanging the column of the S-box. Since each of the row of the S-box of the DES encryption includes one of numbers 0 to 15, the property is unchanged even if the column is exchanged.

An output of an 8-bit internal state 167 is divided to an upper 4-bit 168 and a lower 4-bit 169, so as to be used in designating which column of each S-box 170 should be exchanged. In this case, eight internal states may be prepared so as to change the contents of all S-boxes. Also, in order to save the size of the apparatus, the number of S-boxes for changing can be reduced to be less than eight.

Figure 22:
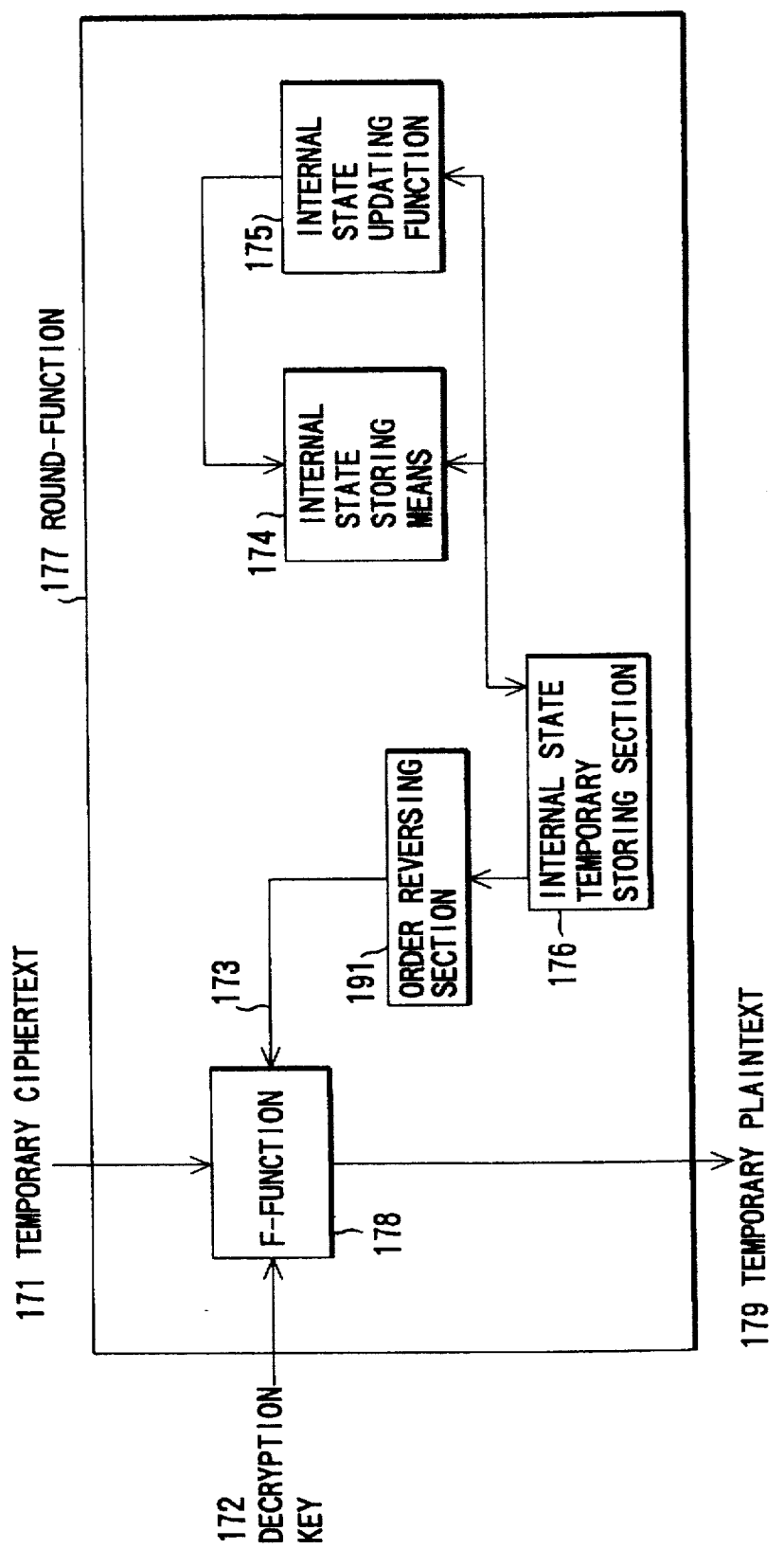
FIG. 22 is a view showing the structure of the round-function in a decryption apparatus for decrypting a ciphertext encrypted by the encryption apparatus of the present invention.

FIG. 22 is a view showing the structure of a round function 177 of a decryption apparatus for decrypting a ciphertext encrypted by the encryption apparatus of the present invention. The round-function 177 comprises an F-function 178, an order reversing section 191, an internal state temporary storing section 176, an internal state storing means 174, and an internal state updating function 175.

In this case, the internal state must be updated in a reserve order in a decryption processing, depending on an encryption mode to be used. In a case where the block encryption is used in a OFB (Output Feedback) mode, such an operation is unnecessary. In the block encryption apparatus of the Feistel type, the decryption processing is executed by the same steps as the encryption processing except that the order of providing a temporary key is reversed. This means that the order of providing the internal state of each round function of the present invention must be reserved.

Prior to the execution of the decryption processing in the round-function 177, an internal state stored in the internal state storing means 174 is updated by the internal state updating function 175, and stored in the internal state temporary storing section 176.

Then, at the time of the decryption processing, a temporary ciphertext 171, an decryption key 172, and a signal 173, which is obtained by reversing the internal state stored in the internal state temporary storing section 176 at the order reserving section 191, are input to the F-function 178, and a predetermined encryption process is performed. Thereby, a temporary plaintext 179 can be obtained as the output of the round-function 177.

FIG. 23 is a view showing the correspondence between the decryption key and the encryption key in each rung of the n rungs of encryption of the Feistel type. At the time of the decryption, the encryption key, which is used in the n-th rung as the final rung at the time of encryption, is used as a decryption key for a first round, and the encryption key of the an (n−1)-th rung is used as a decryption key for a second round. The same can be applied to the operations that follow.

FIG. 24 is a view showing the correspondence between an internal state for a decryption and an internal state for an encryption in each rung of the encryption of the Feistel type. The initial state for a first round decryption must be the same as the initial state for an n-th round encryption. The internal state for a second round decryption must be the same as the internal state for an (n−1)-th round encryption. The same can be applied to the operations that follow. In a case where the internal state updating function has one directionality, the internal state cannot be generated in a reverse order, and the internal states for n rounds ahead cannot be grasped. Due to this, there is needed a mechanism in which the internal states for n rounds are generated to be stored in advance and to be output in a reverse order. The internal state temporary storing section 176 and the order reversing section 191 are shown in FIG. 22 as such a mechanism.

FIG. 25 is a view showing the structure in which the encryption apparatus of the present invention and the decryption apparatus are combined. The encryption apparatus and the decryption apparatus have the same structure, with the exception of the internal state temporary storage. The output of the internal state storing means 182 or the output of the internal state storing section 183 is input to the F-function 184, depending on the state of a switch 181 whose position is changed in accordance with a signal E/O 180 showing an encryption processing or a decryption processing. If such a structure is used, the size of the apparatus can be reduced.

FIG. 26 is a time chart of a pipe-line decryption processing in which no delay is generated. The figure shows that time is advanced along with the direction of the direct arrow. An upper stage 185 shows a state of updating the internal state, and a slash portion 187 shows an updating processing of the internal state. A lower stage 186 shows a state of the decryption processing, and a mesh portion 188 shows the decryption processing. Moreover, an arrow 189 shows a correspondence between the update of the internal state and the decryption processing. For example, the internal state updated at the updating processing 187 is used in the decryption processing 190 pointed out by the arrow 189.

In FIG. 26, in view of the flow of time-series processing, the updating processing 187 of the internal state, which is used in the next decryption processing 190, is executed at the same time as the decryption processing 188. Thereby, the delay of the decryption processing, which is caused by the updating processing of the internal state, can be prevented.

According to the present invention, even in a case where the apparatus is structured by the transform section having a small number of rungs in consideration of the processing speed, the safety of the ciphertext can be improved.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An encryption apparatus including a plurality of rungs of transform sections, each transform section comprising:

storing means for storing an internal state;

internal state updating means for updating the internal state stored in the storing means; and encrypting means for executing an encryption upon receipt of data to be encrypted, an encryption key, and the internal state stored in the storing means, wherein the internal state stored in the storing means is updated by the internal state updating means every time the encryption is executed by the encrypting means.

2. An encryption apparatus including a plurality of rungs of transform sections, each transform section comprising:

storing means for storing an internal state;

internal state updating means for updating the internal state stored in the storing means;

encrypting means for executing an encryption upon receipt of data to be encrypted, an encryption key, and the internal state stored in the storing means; and output controlling means for controlling an output of the encrypting means in accordance with the internal state stored in the storing means, wherein the internal state stored in the storing means is updated by the internal state updating means every time the encryption is executed by the encrypting means.

3. The apparatus according to claim 1 or 2, wherein the internal state updating means has a function as a one directional function.

4. The apparatus according to claim 1 or 2, further comprising an input section for designating the internal state to be initialized.

5. The apparatus according to claim 4, further comprising initializing means for initializing the internal state every time the encryption is executed by the encrypting means.

6. The apparatus according to claim 4, further comprising initializing means for initializing the internal state only once before transmission of a ciphertext obtained by the encryption apparatus is executed between a transmitter and a receiver.

7. The apparatus according to claim 4, further comprising initializing means for initializing the internal state at predetermined timing made in advance between a transmitter and a receiver when transmission of a ciphertext obtained by an encryption processing is executed between the transmitter and the receiver.

8. The apparatus according to claim 1 or 2, wherein the data to be encrypted includes data for designating timing for initializing the internal state.

9. The apparatus according to claim 1 or 2, wherein the encrypting means comprises an expansive permutation section for expansively permutating data to be encrypted, a calculation section for executing a predetermined calculation between an output of the expansive permutation section and an encryption key, and a substitution section for separating an output from the calculation section into a plurality of groups to execute a predetermined substitution of each group.

10. The apparatus according to claim 9, further comprising means for inputting an updatable internal state to the expansive permutation section, so as to control an output from the expansive permutation section.

11. The apparatus according to claim 9, further comprising a bit position variable section for shifting a bit position of an output from the calculation section, the updatable internal state being input to the bit position variable section, so as to control the output from the bit position variable section.

12. The apparatus according to claim 9, further comprising means for performing an exclusive-OR operation with an updatable internal state before the data to be encrypted is expansively permuted by the expansive permutation section.

13. The apparatus according to claim 9, further comprising means for inputting an updatable internal state to the calculation section, so as to control an output from the calculation section.

14. The apparatus according to claim 9, further comprising means for inputting an updatable internal state to the substitution section, so as to control an output from the substitution section.

15. An encryption method including a plurality of transform steps, each transform step comprising:

a storing step for storing an internal state;

an internal state updating step for updating the internal state stored by the storing step; and an encrypting step for executing an encryption upon receipt of data to be encrypted, an encryption key, and the internal state stored by the storing step, wherein the internal state stored by the storing step is updated by the internal state updating step every time the encryption is executed by the encrypting step.

16. An encryption method including a plurality of transform steps, each transform step comprising:

a storing step for storing an internal state;

an internal state updating step for updating the internal state stored by the storing step;

an encrypting step for executing an encryption upon receipt of data to be encrypted, an encryption key, and the internal state stored by the storing step; and output controlling step for controlling an output obtained by the encrypting step in accordance with the internal state stored by the storing step, wherein the internal state stored by the storing step is updated by the internal state updating step every time the encryption is executed by the encrypting step.

* * * * *